Oct. 20, 1959   V. J. JANDASEK   2,909,034
HYDROKINETIC TORQUE CONVERTER WITH ADJUSTABLE REACTOR BLADES
Filed May 13, 1957  2 Sheets-Sheet 1

VLADIMIR J. JANDASEK
INVENTOR.

ATTORNEYS

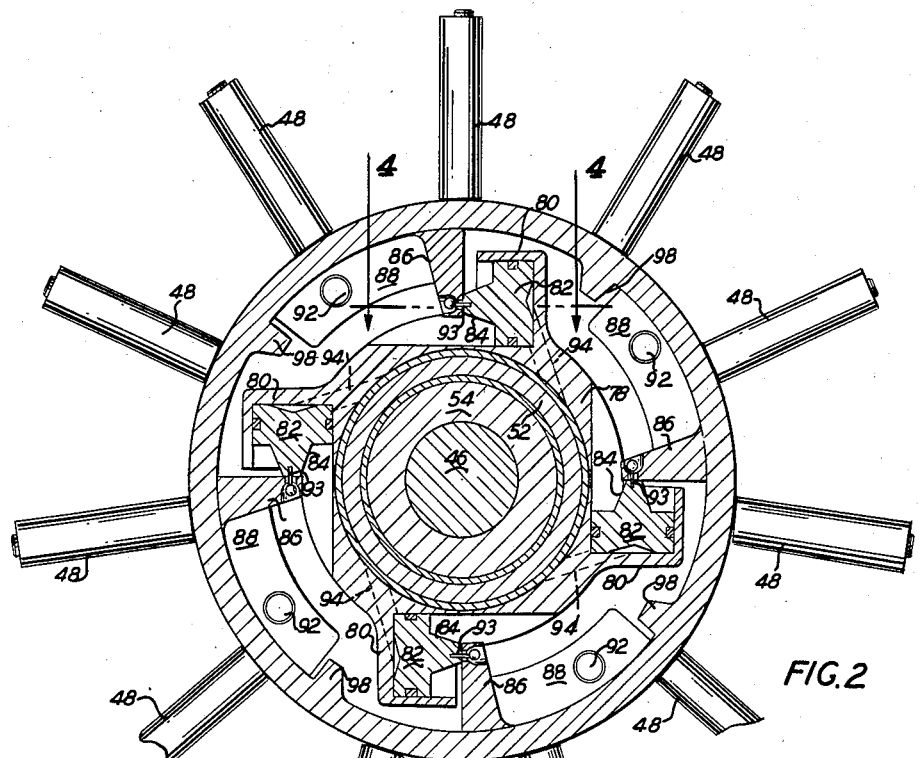
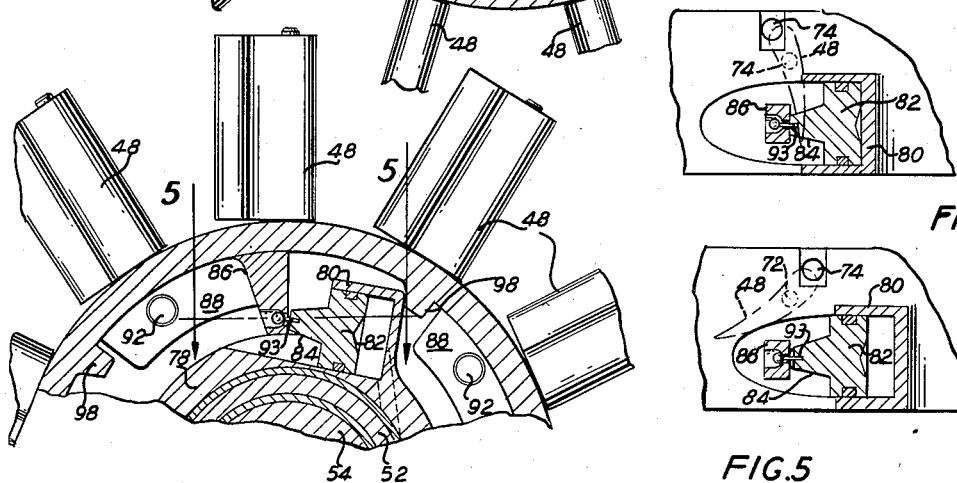

United States Patent Office 2,909,034
Patented Oct. 20, 1959

2,909,034

HYDROKINETIC TORQUE CONVERTER WITH ADJUSTABLE REACTOR BLADES

Vladimir J. Jandasek, Dearborn, Mich., assignor to Ford Motor Company, Dearborn, Mich., a corporation of Delaware Application May 13, 1957, Serial No. 658,801

9 Claims. (Cl. 60—54)

My invention relates generally to hydrokinetic torque converters and more particularly to a new and improved reactor assembly for use therewith.

A hydrokinetic torque converter mechanism is generally comprised of at least one engine driven bladed pump member, at least one bladed turbine member and a reactor assembly including a cascade of reactor blades or vanes located between the turbine member fluid exit section and the pump member fluid entrance section. These members cooperate to define a continuous toroidal fluid circuit, the pump member establishing fluid circulation within the circuit. The driving torque of the pump is transmitted to the turbine member through the medium of the circulating fluid and the reactor member redirects the fluid passing from the turbine exit section to the pump entrance section thereby providing a torque contribution which is additive and positive in character. The overall ratio of the turbine torque to the pump torque is thus greater than unity and the resulting torque reaction on the reactor member is transmitted to the stationary housing through a one-way brake.

For the purpose of analytically determining the magnitudes of the turbine torque and the pump torque, the tangential component of the absolute velocity of a particle of fluid traveling along the mean streamline within the torus circuit must be determined; and this may be done by means of a vector analysis. It may be shown that the value of the velocity components under any given driving condition will be a function of the speed of rotation of the converter member involved, the radius of the location in the circuit at which the velocity is to be computed, the blade geometry at that location and the torus flow velocity. If the tangential velocity components are computed for the entrance and exit sections of each of the bladed converter members, expressions for pump torque and converter torque may be set forth by making use of momentum relationships. For example, the turbine torque at any instant is equal to the moment of momentum of fluid leaving the turbine member less that of the fluid which enters; but since the moment of momentum of the fluid entering the turbine member equals the moment of momentum of fluid leaving the exit section of the pump member (assuming that the converter is of the three-element type), then the turbine torque equals the moment of momentum of fluid leaving the turbine member less the moment of momentum of fluid leaving the pump member. Similarly, the pump torque equals the moment of momentum of the fluid leaving the pump member less that of the fluid leaving the reactor exit section.

Since the moment of momentum of a body of fluid at any point in the circuit is a function of the mass rate of flow of the circulating fluid, the radius at that point and the tangential component of the absolute velocity at that point, it therefore follows that if the tangential component of the absolute velocity of fluid leaving the reactor is increased in magnitude, the magnitude of the pump torque relative to the turbine torque will be reduced and the torque ratio for the converter mechanism will be increased.

The tangential component of the absolute velocity vector for a particle of fluid leaving the reactor exit section is a direct function of the torus flow velocity and the reactor exit blade angle. If it is assumed that the reactor exit angle is the acute angle formed by the tangent to the blade surface at the exit location and a plane perpendicular to the axis of rotation, the tangential component of the absolute velocity may be expressed as the product of the torus flow velocity and the cotangent of the reactor exit angle. It is thus apparent that the magnitude of the converter torque ratio is dependent upon the magnitude of the reactor exit angle and that if the reactor exit angle is decreased in magnitude, assuming the other characteristics of the mechanism remain constant, the overall torque ratio will be increased.

According to a principal feature of my instant invention I have made provision for adjusting the effective blade angles of the reactor member from one position to another thereby obtaining a desired alteration in the torque ratio for any given speed ratio. I contemplate that the blades may be adjusted to a so-called high performance position with decreased blade exit angles to produce an increased torque ratio in the low speed ratio range. At higher speed ratios and during operation in the converter coupling range the reactor blades may be adjusted to provide an increased blade exit angle thereby providing for increased efficiency during cruising. During operation in the low speed ratio range with the reactor blades in the high performance position, the performance is improved at the expense of the performance at the higher speed ratios; and during operation with the reactor blades in the cruising position, performance at the lower speed ratios is sacrificed in order to obtain increased efficiency at the higher speed ratios. It is thus apparent that the adjustable blade feature of my instant invention makes it possible to utilize the more advantageous portions of the performance relationships corresponding to each operating position of the reactor.

I further contemplate that the improved torque converter construction of my instant invention may be used with a multiple speed, automatic transmission and that suitable controls may be used for effecting an adjustment of the reactor blades to the high performance position whenever a sudden increase in operating torque is desired; for example, during "kick down." Such controls may be of the manual type or they may be semi-automatic or fully automatic in character.

The provision of an improved torque converter construction of the type above set forth being a principal object of my invention, it is a further object of my invention to provide a hydrokinetic torque converter mechanism with a bladed reactor member wherein the reactor blades are each mounted for rotation about an individual radial axis to any of a plurality of operating positions.

It is a further object of my invention to provide a torque converter reactor assembly as above set forth wherein fluid pressure operated servo means are incorporated therein for adjustably positioning the reactor blades in unison, said servo means including a plurality of tangentially positioned cylinders and pistons and a common blade operating member actuated thereby.

It is a further object of my invention to provide an improved torque converter construction as above set forth wherein the blade adjusting portions form a part of the reactor assembly and are of compact and simplified construction with a reduced overall axial dimension.

Further objects and features of my invention will readily become apparent from the following description and from the accompanying drawings wherein:

Figure 2 is a transverse cross sectional view of the reactor assembly shown in Figure 1 and is taken along section line 2—2 of Figure 1. The reactor blades shown in Figure 2 are in the cruising position;

Figure 3 is a partial cross sectional view of the reactor assembly showing the reactor blades in the high performance position;

Figure 4 is a detailed cross sectional view of a portion of the reactor blade adjusting servo means and is taken along section line 4—4 of Figure 2. The relatively movable portions of the servo means are shown in Figure 4 in the position corresponding to the cruising range;

Figure 5 is a view similar to that of Figure 4 showing the relatively movable portions of the servo means in the position corresponding to the high performance range;

Figures 1, 6, 7:
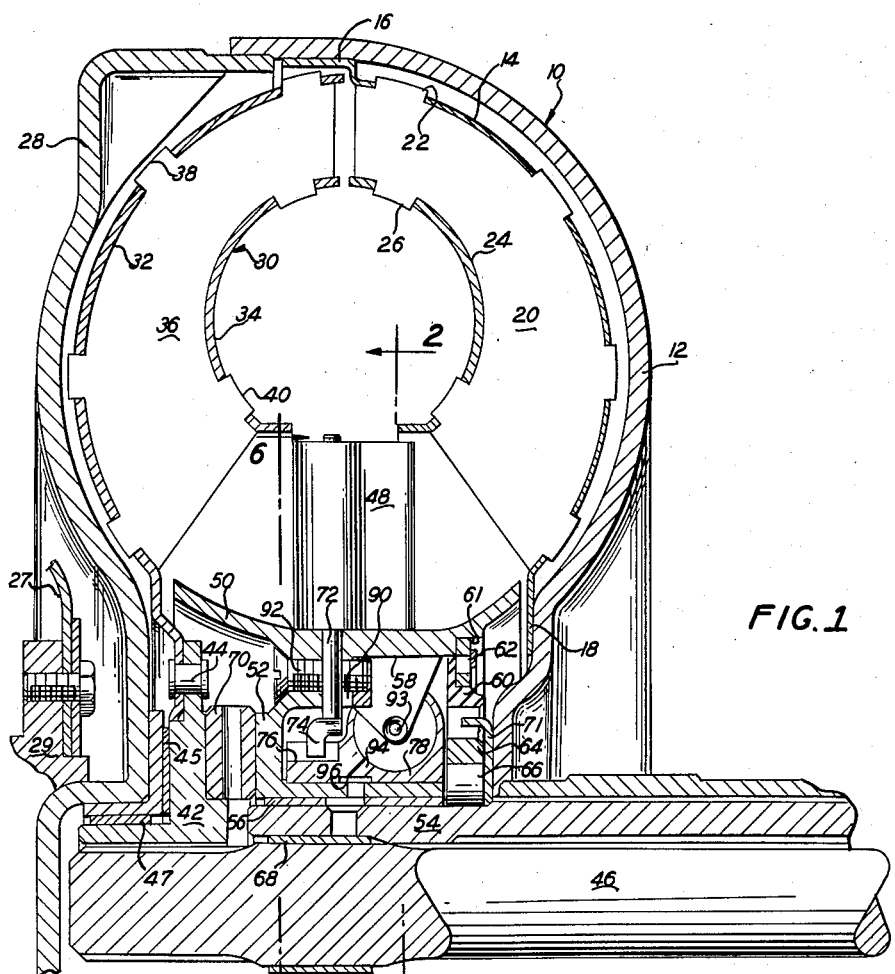
Figure 1 shows a cross sectional assembly view of the improved torque converter construction of my instant invention and is taken along a plane containing the axis of rotation of the pump and turbine members.
Figure 6 is a partial transverse sectional view showing a portion of the blade adjusting mechanism and it is taken along section line 6—6 of Figure 1. The position of the reactor blades indicated in Figure 6 corresponds to the cruising range.
Figure 7 is a view similar to that of Figure 6 wherein the reactor blades are illustrated in the high performance position.

Referring first to Figure 1, numeral 10 generally designates the hydrokinetic pump member and it is comprised of an outer shell 12 within which is fixed an outer pump shroud 14, the latter having a toroidal shape similar to that of the pump shell 12. The shroud 14 is permanently secured at the radially outward and the radially inward portions thereof as indicated at 16 and 18 respectively. Pump blades 20 are received at angularly spaced positions within the shroud 14 and they may be secured in place by means of tabs 22 received within cooperating openings formed in the shroud 14. An inner shroud 24 is joined to the radially inward edge of the blades 20 and it may be secured in place by means of tabs 26 formed on the blades 20 and received through corresponding openings in the inner shroud 24. The shrouds 24 and 14 cooperate to define a portion of a torus flow path extending from a radially inward region of the converter assembly to the outermost radial region.

The pump shell 12 may be drivably connected to a pump drive plate 28 which may in turn be coupled to a flexible flywheel shown in part at 27. An engine crankshaft 29 for an internal combustion engine may be bolted to the hub of the flywheel 27 as indicated thereby providing a driving connection between the engine and the pump member 10.

A turbine member is generally designated in Figure 1 by numeral 30 and it is positioned in juxtaposed relationship with respect to pump member 10. Turbine member 30 is comprised of an outer shroud 32 having a shape similar to the previously described pump shroud 14. An inner turbine shroud is shown at 34 and it cooperates with the outer shroud 32 to define a second portion of the above-described torus flow path. A series of turbine blades is interposed between the inner and outer shrouds 30 and 32 respectively in angularly spaced relationship, said blades being designated by numeral 36. A series of tabs 38 is formed on the outer edge of the blades 36 and they are received within mating openings formed in the outer shroud 32 to retain the blades securely in place in their proper angular position. Similarly, tabs 40 are received through mating openings formed in the inner shroud 34 for the same purpose.

The turbine member is supported by a turbine hub 42 which may be permanently secured to the outer turbine shroud 32 as indicated at 44. The hub 42 may in turn be positively splined to a power delivery shaft 46, the latter being adapted to transmit driving torque to the power input gear of a suitable gear assembly, not illustrated. Bushings 45 and 47 may be provided as shown between the hub and a central pilot portion of drive plate 28.

A series of reactor blades 48 are situated within the radially inward region of the torus circuit defined by the cooperating pump and turbine members and it includes a circular shroud 50 which defines the inner extremity of the torus circuit. It is thus apparent that the bladed pump member 20 is capable of establishing toroidal fluid circulation and that fluid will enter the pump blades 20 at a radially inward region and will discharge the fluid at the outer region into the inlet section of the turbine member 30. Fluid will then be returned to the radially inward portion of the fluid circuit and pass through the cascade of reactor blades 48 and will be returned to the inlet section of the pump member 10. A driving torque will thus be transmitted to the turbine member 30 by reason of the change in the tangential component of the absolute velocity vector for the fluid as it passes through the turbine member. The reactor blades then redirect the fluid as it passes from the turbine outlet section to the pump inlet section as previously described thus causing an overall torque multiplication.

The reactor shroud 50 is formed integrally with and defines a part of a hub 52 which may be journaled on a relatively stationary sleeve shaft 54 by means of suitable bushings 56, said sleeve shaft in turn being connected to the transmission housing. The reactor hub 52 is formed with an annular cavity 58 and the open end thereof may be at least partly closed by a closure member 60 which in turn may be received within the shroud 50 and held in place by a suitable snap ring 62 or the like. Radial inserts are imbedded in the member 60 and are located in recesses 61 in the reactor shroud 50 to prevent relative movement of the latter with respect to member 60. The member 60 defines an outer race 64 for one-way brake rollers 66, the latter being effective to brake the reactor assembly to the sleeve shaft 54 against rotation in one direction while permitting rotation in the other direction. The shaft 54 is further adapted to rotatably journal the above-mentioned power delivery shaft 46 by means of a bushing 68. A roller thrust bearing 70 is interposed between the turbine hub 42 and the reactor hub 52; and a washer 71 is situated between the central portion of shell 12 and the one-way brake for the reactor assembly, the member 60 being apertured as shown to receive a tang on washer 71 thereby preventing rotation of the latter.

Each of the reactor blades 48 is mounted upon an individual spindle shaft 72 which extends radially through the hub 52 into annular recesses 58. A radially inward end of each spindle shaft 72 is formed with an offset crank portion 74 which is received within an axially extending slot 76 formed in an adjustable servo element 78.

Referring more particularly to Figure 2 the servo element 78 is generally circular in shape and it is formed with four equally spaced servo cylinders 80. By preference the cylinders 80 may be cast integrally with the servo element 78. The axis of each of the cylinders 80 extends in a tangential direction with respect to the axis of rotation of the pump and turbine members and they are each spaced an equal distance from the axis of rotation.

Each of the cylinders 80 has received therein a relatively movable piston 82 having a tangentially extending abutment 84 which is adapted to engage one of several radially extending shoulders 86. The shoulders 86 are formed on plates 88 which in turn may be positively secured against an annular shoulder 90 within the recesses 58 by means of bolts 92. The abutments 84 are pinned to the adjacent shoulders 86, as best seen in Figures 4 and 5, by means of round headed studs 93 extending through the abutments 86. The abutments 86 may be apertured as indicated to loosely receive the heads of the studs 93, and sufficient free play between the studs 93 and the mating apertures to permit a small degree of angular displacement of the pistons 82 when the mechanism assumes the position shown in Figure 3.

The servo element 78 may be formed with internal passages 94 which in turn may communicate with an annular groove 96 formed on the inner surface of the servo element 78. A suitable fluid pressure passage may be provided for supplying pressurized fluid to the annular groove 96. In order to simultaneously pressurize each of the cylinders 80 this pressure passage may form a portion of the automatic control circuit for the transmission of which this improved torque converter construction forms a part. The servo element 78 is rotatably journaled within the reactor recess 58 in the reactor hub 52 and when the cylinders 80 are pressurized the pistons 82 are urged against the shoulders 86. Since the latter are held in a relatively stationary position, the servo element 78, together with the cylinders 80, are shifted angularly about the axis of the converter. This causes the crank 74 at the radially inward end of each of the spindles 72 to move with the servo element 78 thereby causing each of the spindles to rotate about its geometric axis. Since the blades 48 are fixedly carried by their respective spindle shafts 72, the blades 48 are adjusted from one position to another as the servo element 78 is caused to rotate about its axis.

As best seen in Figures 4 and 5 the blades 48 are caused to assume a position with a relatively large reactor exit angle when the cylinders 80 are de-energized. However, when the cylinders 80 are pressurized the servo element 78 is shifted relative to the pistons 82 thereby causing the blades 48 to assume the position shown in Figure 5 wherein the reactor exit angle is relatively small. The pivotal axis of the blades 48 is relatively close to the rounded nose of the blades 48 and the influence of the resulting change in the reactor entrance angle is relatively slight as compared to the influence of the accompanying change in reactor exit angle for any given degree of rotation of the spindle shafts. As best seen in Figure 3 the servo element 78 will rotate about its axis until contact is made between the cylinders 80 and fixed stops 98. The position illustrated in Figure 3 therefore represents one extreme position for the blades 48.

Although I have specifically illustrated four individual cylinder and piston arrangements, I contemplate that a different number of such cylinder and piston arrangements may be situated within the reactor assembly at strategically placed locations with the axes thereof extending in a tangential or normal direction. The reduced axial dimension of the reactor assembly, which is one of the characteristic advantages of my improved construction, would not be altered by reason of the change in the number of working chambers. However, regardless of the number of piston and cylinder arrangements used, the blade adjustment is effected by pressurizing the working chambers defined by the individual cylinders. The servo element 78 may be returned to its de-energized or cruising position merely by exhausting the fluid pressure from the individual working chambers, the converter charge pressure being effective to urge the relatively movable components toward the position shown in Figure 2 from that shown in Figure 3.

The use of a multiple cylinder and piston arrangement in the strategic fashion herein described makes it possible to reduce the transverse dimension of the fluid actuated parts. Also, return springs are not required thus considerably simplifying the arrangement.

When the reactor blades are shifted to the high performance position as above described the engine speed for any given torque ratio will increase considerably thereby making it possible to obtain a torque multiplication in the converter at higher vehicle speeds. However, I contemplate that in most instances the torque requirements will fall somewhere within the limits established by the two operating positions of the stator blades. In order to get the optimum performance under all conditions, the transmission control circuit may be modified to provide the reactor servo structure with a modulated actuating pressure which is sensitive to engine torque and engine speed or to engine torque and speed ratio. Any of an infinite number of operating positions between the two above-described limits could thus be obtained as required by the vehicle during operation.

Although I have specifically described a preferred construction of my instant invention, I intend that the scope of my invention should be defined only by the language of the following claims and that it should not be limited to the preferred construction disclosed herein.

I claim:

1. In a hydrokinetic torque converter comprising an engine driven pump member, a turbine member and a reactor member, said members having a common axis of rotation and cooperating to define at least in part a continuous toroidal fluid circuit, said reactor member comprising a plurality of blades disposed about the axis of said converter in generally radial directions and in a radially inward region of said fluid circuit between the fluid flow exit of said turbine member and the fluid flow entrance of said pump member, a stationary shaft coaxially disposed relative to said reactor member, said reactor member including a reactor hub, one-way coupling means for anchoring said reactor hub against said stationary shaft to prevent rotation thereof in one direction, a separate mounting shaft carrying each of said blades, said shafts extending radially inward within said hub, and fluid pressure operated servo means including relatively movable pressure operated parts situated within said reactor hub for adjustably positioning said blades about the axis of said shafts, one of said parts being mechanically connected to the radially inward end of said shafts whereby rotary movement of said one part about said axis is translated into a pivotal movement of said shafts about their respective axes, the other relatively movable part being connected to said hub whereby the force reaction of said servo means is transmitted to said stationary shaft through said one-way coupling means, the direction of relative movement of said pressure operated parts being tangential with respect to the axis of said converter.

2. In a hydrokinetic torque converter, a bladed reactor member comprising a circular shroud, a plurality of blades mounted at spaced locations about said shroud and extending outwardly in a generally radial direction therefrom, a plurality of mounting shafts, a separate one of said blades being mounted on each of said shafts, one end of each shaft being offset and extending radially inward to the interior of said shroud, a stationary shaft coaxially disposed relative to said reactor member, a one-way coupling means for anchoring said shoud to said stationary shaft, a blade operating member mounted within said reactor shroud for limited angular movement about the geometric axis of the latter, a mechanical connection between said blade operating member and the radially inward end of each shaft, said mechanical connections being adapted to translate a rotary motion of said blade operating member about its axis to a rotary motion of said shafts about their radially disposed axes, and fluid pressure operated servo means for adjustably positioning said blade operating member, said servo means including a servo member and a piston member cooperating to define a fluid pressure chamber, one member of said servo means being connected to said blade operating member and the other member thereof being connected to said shoud whereby the force reaction of said servo means is transmitted through said one-way coupling means to said stationary shaft, the axis of said piston and cylinder members extending in a tangential direction relative to the axis of said reactor member.

3. In a hydrokinetic torque converter, a pump member, a turbine member and a vaned reactor member disposed in torodial fluid flow relationship, said reactor member being situated in a radially inward fluid flow region between the exit of said turbine member and the inlet of said pump member and comprising a circular hub, a plurality of vanes mounted at angularly spaced locations about said hub and extending outwardly in a generally radial direction therefrom, a stationary reactor shaft extending through said hub, one-way coupling means for anchoring said hub to said stationary shaft to inhibit rotation thereof in one direction and to accommodate rotation thereof in the opposite direction, a plurality of mounting shafts, a separate one of said vanes being mounted on each of said shafts, said hub having a central cavity therein, one end of each of said shafts extending radially inward within said cavity, a generally circular vane operating member mounted within said hub for limited angular movement about the geometric axis of the latter, the radially inward end of each of said shafts being offset to form a crank, a mechanical connection between said vane operating member and the crank for each of said shafts, and fluid pressure operated servo means for adjustably positioning said vane operating member about its axis thereby adjustably positioning said blades in unison about the radially disposed axes of their respective mounting shafts to effect a change in the characteristic angles for said vanes, said servo means comprising a fluid pressure cylinder member and a piston member cooperating to define a fluid pressure chamber, one member of said servo means being connected to said vane operating member and the other being connected to said hub whereby the force reaction of said servo means is transmitted through said coupling means to said stationary shaft, the axis of said cylinder member and said piston member being tangential relative to the geometric axis of said hub.

4. In a hydrokinetic torque converter, a pump member, a turbine member and a vaned reactor member disposed in toroidal fluid flow relationship, said reactor member being situated in a radially inward fluid flow region between the fluid flow exit of said turbine member and the fluid flow entrance of said pump member and comprising a circular hub, a stationary reactor shaft extending through said hub, one-way coupling means for anchoring said hub to said reactor shaft to inhibit rotation thereof in one direction and to accommodate rotation thereof in the opposite direction, a plurality of vanes mounted at angularly spaced locations about said hub and extending in a generally radial direction therefrom, a plurality of mounting shafts, a separate one of said vanes being mounted on each of said shafts, said hub having a central cavity therein, one end of each of said shafts extending radially inward within said cavity, a generally circular vane operating member mounted within said hub for limited angular movement about the geometric axis of the latter, a mechanical connection between said vane operating member and the radially inward end of each shaft, and a plurality of individual fluid pressure operated servo mechanisms, each servo mechanism comprising relatively movable cylinder and piston members with a common linear axis, the direction of the axis for each cooperating cylinder member and piston member being disposed in a normal direction with respect to the axis of said hub, said cylinder member being defined in part by said vane operating member and said piston member being connected to said hub whereby the force reaction of said servo means is transmitted through said coupling means to said stationary shaft.

5. In a hydrokinetic torque converter, a pump member, a turbine member and a vaned reactor member disposed in toroidal fluid flow relationship, said reactor member being situated in a radially inward fluid flow region between the fluid flow exit of said turbine member and the fluid flow entrance of said pump member and comprising a circular hub, a plurality of vanes mounted at angularly spaced locations about said hub and extending outwardly in a generally radial direction therefrom, a plurality of mounting shafts, a stationary reactor shaft concentrically disposed within said hub, one-way coupling means for anchoring said hub to said reactor shaft, a separate one of said vanes being mounted on each of said shafts, said hub having a central cavity therein, one end of each of said shafts extending radially inward within said cavity, a generally circular vane operating member mounted within said hub for limited angular movement about the geometric axis of the latter, a mechanical connection between said vane operating member and the radially inward end of each shaft, and a plurality of individual fluid pressure operated servo mechanisms, each servo mechanism comprising relatively movable cylinder and piston members having a common axis, the direction of the axis for each cooperating cylinder ember and piston member being disposed in a normal direction with respect to the axis of said hub, one of the said members of each servo mechanism being carried by said vane operating member and the other of said members of each servo mechanism being engageable with a relatively stationary part of said hub, whereby the force reaction of said servo mechanism is transmitted through said one-way coupling means to said reactor shaft, said servo mechanism and said vane operating member being assembled with a total axial dimension which is less than the mean distance between the exit of said turbine member and the entrance of said pump member.

6. In a hydrokinetic torque converter, a pump member, a turbine member and a vaned reactor member disposed in toroidal fluid flow relationship, said reactor member being situated in a radially inward fluid flow region between the fluid flow exit of said turbine member and the fluid flow entrance of said pump member and comprising a circular hub, a plurality of vanes mounted at angularly spaced locations about said hub and extending outwardly in a generally radial direction therefrom, a stationary reactor shaft concentrically disposed within said hub, one-way coupling means for anchoring said hub to said reactor shaft, a plurality of mounting shafts, a separate one of said vanes being mounted on each of said shafts, said hub having a central cavity therein, one end of each of said shafts extending radially inward within said cavity, a generally circular vane operating member mounted within said hub for limited angular movement about the geometric axis of the latter, a mechanical connection between said vane operating member and the radially inward end of each shaft, and a plurality of individual fluid pressure operated servo mechanisms, each servo mechanism comprising relatively movable cylinder and piston members having a common axis, the direction of the axis for each cooperating cylinder member and piston member being disposed in a normal direction with respect to the axis of said hub, the cylinder members of said servo mechanisms being carried by said vane operating member and the piston members of said servo mechanisms being engageable with a part of said hub, whereby the forced reaction of said servo mechanism is transmitted through said one-way coupling means to said reactor shaft, said servo mechanism and said vane operating member being assembled with a total axial dimension which is less than the mean distance between the exit of said turbine member and the entrance of said pump member.

7. In a hydrokinetic torque converter, a pump member, a turbine member and a vaned reactor member disposed in toroidal fluid flow relationship, said reactor member being situated in a radially inward fluid flow region between the fluid flow exit of said turbine member and the fluid flow exit of said pump member and comprising a circular hub, a plurality of vanes mounted at angularly spaced locations about said hub and extending in a generally radial direction therefrom, a plurality of mounting shafts, a stationary reactor shaft concentrically disposed within said hub, one-way coupling means for anchoring said hub to said reactor shaft, a separate one of said vanes being mounted on each of said shafts, said hub having a central cavity therein, one end of each of said shafts extending radially inward within said cavity, a generally circular vane operating member mounted within said hub for limited angular movement about the geometric axis of the latter, a mechanical connection between said vane operating member and the radially inward end of each shaft, a plurality of individual fluid pressure operated servo mechanisms, each servo mechanism comprising relatively movable cylinder and piston members having a common axis, the direction of the axis for each cooperating cylinder member and piston member being disposed in a normal direction with respect to the axis of said hub, a plurality of reaction shoulders situated within said cavity and forming a part of said hub, the cylinder members for said servo mechanisms being carried by said vane operating member and the piston members for said servo mechanisms being engageable with said shoulders, whereby the force reaction of said servo mechanism is transmitted through said one-way coupling means to said reactor shaft, said servo mechanism and said vane operating member being assembled wholly within said hub.

8. In a hydrokinetic torque converter, a pump member, a turbine member and a vaned reactor member disposed in toroidal fluid flow relationship, said reactor member being situated at a radially inward fluid flow region between the turbine member exit and the pump member entrance and comprising a circular hub, a plurality of vanes mounted at angularly spaced locations about said hub and extending in a generally radial direction therefrom, a plurality of mounting shafts, a separate one of said vanes being mounted on each of said shafts, a stationary reactor shaft concentrically disposed in said hub, one-way coupling means for anchoring said hub to said reactor shaft, said hub having a central cavity therein, one end of each of said shafts extending radially inward within said cavity, a generally circular vane operating member mounted within said hub for limited angular movement about the geometric axis of the latter, a mechanical connection between said vane operating member and the radially inward end of each shaft, a plurality of individual fluid pressure operated servo mechanisms, each servo mechanism comprising relatively movable cylinder and piston members having a common axis, the direction of the axis for each cooperating cylinder member and piston member being disposed in a normal direction with respect to the axis of said hub, a plurality of reaction shoulders situated within said cavity and forming a part of said hub, the cylinder members for said servo mechanisms being carried by said vane operating member, the piston member and cylinder member of each servo mechanism defining an independent working chamber, the piston members of said servo mechanisms being mechanically secured to said shoulders, said vanes being rotated in one direction when actuating fluid is introduced into said working chambers and said vanes being moved in the opposite direction under the influence of fluid pressure existing in the region of said cylinder and piston members on the exterior of said working chambers, said servo mechanism and said vane operating member being disposed wholly within said central hub cavity.

9. In a hydrokinetic torque converter, a pump member, a turbine member and a vaned reactor member disposed in toroidal fluid flow relationship, said reactor member being situated in a radially inward fluid flow region between the turbine member exit and the pump member entrance and comprising a circular hub, a plurality of vanes mounted at axially spaced locations about said hub and extending in a generally radial direction therefrom, a plurality of mounting shafts, a separate one of said vanes being mounted on each of said shafts, a stationary reactor shaft concentrically disposed within said hub, one-way coupling means for anchoring said hub to said reactor shaft, said hub having a central cavity therein, one end of each of said shafts extending radially inward within said cavity, a generally circular vane operating member mounted within said hub for limited angular movement about the geometric axis of the latter, the radially inward end of each of said shafts being offset to form a crank, a plurality of slots formed on the radially outward side of said vane operating member, said shafts extending in a generally axial direction, the offset end of each crank being received in a separate one of said slots, and fluid pressure operated servo means for adjustably positioning said vane operating member about its axis thereby adjustably positioning said vanes in unison about the radially disposed axes of their respective mounting shafts, said servo means including fluid pressure operated parts adapted for relative movement along a line of motion substantially perpendicular in direction to said geometric axis, one of said parts being connected to said hub and the other part being connected to said vane operating member, said servo means and said vane operating member being situated wholly within said central hub cavity.

References Cited in the file of this patent
UNITED STATES PATENTS 2,327,647    Jandasek _____ Aug. 24, 1943

FOREIGN PATENTS 425,538    Great Britain _____ Mar. 18, 1935
444,171    Great Britain _____ Mar. 16, 1936